(12) United States Patent
Berendes et al.

(10) Patent No.: US 10,938,265 B2
(45) Date of Patent: Mar. 2, 2021

(54) CANNED MOTOR HAVING A SUPPORTING END PLATE

(71) Applicant: Dr. Ing. h.c. F. Porsche Aktiengesellschaft, Stuttgart (DE)

(72) Inventors: Philipp Berendes, Stuttgart (DE); Bernhard Wiedemann, Stuttgart (DE); Stefan Oechslen, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/449,783

(22) Filed: Jun. 24, 2019

(65) Prior Publication Data
US 2020/0007000 A1 Jan. 2, 2020

(30) Foreign Application Priority Data

Jul. 2, 2018 (DE) ..................... 10 2018 115 927.7

(51) Int. Cl.
*H02K 5/128* (2006.01)
*H02K 5/15* (2006.01)
*H02K 9/197* (2006.01)

(52) U.S. Cl.
CPC ............... *H02K 5/15* (2013.01); *H02K 9/197* (2013.01)

(58) Field of Classification Search
CPC ........... H02K 5/128; H02K 9/19; H02K 9/197
See application file for complete search history.

(56) References Cited

U.S. PATENT DOCUMENTS

| 2,799,227 | A | * | 7/1957 | Allen | F04D 13/0613 |
| | | | | | 417/357 |
| 2,972,308 | A | * | 2/1961 | Haggerty | F02M 37/10 |
| | | | | | 417/357 |
| 2,975,309 | A | * | 3/1961 | Seidner | H02K 9/197 |
| | | | | | 310/54 |
| 2,994,795 | A | | 8/1961 | Cattabiani | |
| 3,075,107 | A | * | 1/1963 | Eis | H02K 9/22 |
| | | | | | 310/64 |
| 5,068,556 | A | * | 11/1991 | Lykes | H02K 5/15 |
| | | | | | 310/89 |

(Continued)

FOREIGN PATENT DOCUMENTS

| CN | 102598483 A | 7/2012 |
| CN | 105048662 A | 11/2015 |

(Continued)

OTHER PUBLICATIONS

Chinese Office Action for Chinese Application No. 201910567783.4, dated Nov. 26, 2020 with translation, 13 pages.

*Primary Examiner* — Dang D Le
(74) *Attorney, Agent, or Firm* — RatnerPrestia

(57) ABSTRACT

A canned motor has a stator which has a laminated core and a winding with winding heads which project out of the laminated core on end sides of the laminated core. A rotor is mounted rotatably with respect to the stator. A can is arranged between the stator and the rotor. An end plate bears against an end side of the laminated core and has recesses for leading through the winding. A supporting ring is arranged concentrically with respect to the can on the outer side of the can in the region of the winding heads. The end plate and the supporting ring are configured as a single-piece supporting end plate.

15 Claims, 4 Drawing Sheets

(56) References Cited

U.S. PATENT DOCUMENTS

| | | | | |
|---|---|---|---|---|
| 5,233,248 A | * | 8/1993 | Kawamura | H02K 1/185 |
| | | | | 310/156.25 |
| 8,133,053 B2 | | 3/2012 | Klee et al. | |
| 9,130,417 B2 | | 9/2015 | Bode | |

FOREIGN PATENT DOCUMENTS

| | | |
|---|---|---|
| DE | 3037147 C2 | 6/1986 |
| DE | 4111466 A1 | 10/1992 |
| DE | 102007014691 A1 | 10/2008 |
| DE | 102010055821 A1 | 6/2012 |
| DE | 202010018078 U1 | 1/2014 |
| FR | 1158578 A | 6/1958 |
| GB | 963880 | 7/1964 |
| JP | 06276713 A | 9/1994 |
| WO | 2013183114 A1 | 12/2013 |

\* cited by examiner

CANNED MOTOR HAVING A SUPPORTING END PLATE

CROSS-REFERENCE TO RELATED APPLICATION

This application claims priority to German Patent application No. DE 10 2018 115 927.7, filed Jul. 2, 2018, which is incorporated by reference herein in its entirety.

FIELD OF THE INVENTION

The invention relates to a canned motor having a stator which has a laminated core and a winding with winding heads which project out of the laminated core on end sides of the laminated core, a rotor which is mounted rotatably with respect to the stator, a can which is arranged between the stator and the rotor, an end plate which bears against an end side of the laminated core and has recesses for leading through the winding, and a supporting ring which is arranged concentrically with respect to the can on the outer side of the can in the region of the winding heads.

BACKGROUND OF THE INVENTION

Canned motors of this type are configured as electric drive machines, for example as permanently excited synchronous machines. Canned motors can be cooled via a direct winding head cooling means, in the case of which a liquid cooling medium washes around the winding heads of the stator winding.

A canned motor of the type mentioned at the outset is known from DE 10 2010 055 821 34, which is incorporated by reference herein. In the case of said canned motor, end plates are connected to the laminated core of the stator on the end sides of the stator. Said end plates have a plurality of recesses, through which the winding of the stator is guided, with the result that the winding heads of the winding are situated outside the end plates. Supporting rings which are configured in each case as winding head supports are arranged in the region of said winding heads, which supporting rings are arranged concentrically with respect to the can. The can is formed from a sealing compound which is cast onto the supporting rings, with the result that the outer side of the can bears against the respective supporting ring after the sealing process. Relatively high assembly complexity arises in the case of said canned motor, since the end plates and supporting rings have to be aligned with one another carefully, in order to prevent leaks which, during the sealing process, might lead to an undesired penetration of sealing compound into the region of the winding heads.

Against this background, it would be desirable to reduce the assembly complexity during the production of a canned motor.

SUMMARY OF THE INVENTION

According to one aspect of the invention, a canned motor has a stator which has a laminated core and a winding with winding heads which project out of the laminated core on end sides of the laminated core, a rotor which is mounted rotatably with respect to the stator, a can which is arranged between the stator and the rotor, an end plate which bears against an end side of the laminated core and has recesses for leading through the winding, and a supporting ring which is arranged concentrically with respect to the can on the outer side of the can in the region of the winding heads, the end plate and the supporting ring being configured as a single-piece supporting end plate.

The single-piece supporting end plate can take over both the function of the end plate and the function of the supporting ring, with the result that the number of required components can be reduced. During the assembly of the canned motor, it is not necessary to align the end plate and the supporting ring to one another. Rather, the single-piece supporting end plate can be arranged on the end side of the stator, in order to assemble the end plate and the supporting ring. This therefore results in reduced assembly complexity. Furthermore, the supporting end plate has an increased rigidity and load-bearing capability in comparison with a construction with a separately configured end plate and supporting ring. As a consequence, the end plate and the supporting ring can be configured with a reduced wall thickness, as a result of which a more compact design is made possible.

The end plate of the supporting end plate preferably extends in a plate plane which is arranged transversely, in particular perpendicularly, with respect to a circumferential face of the supporting ring of the supporting end plate. The plate plane is particularly preferably arranged parallel to a radial direction of the supporting ring.

In accordance with one advantageous refinement, the end plate and the supporting ring are configured from a non-metallic material, in particular from a plastic, with the result that undesired eddy current losses are reduced during the operation of the canned motor. Furthermore, the electric insulation can be improved as a result. The single-piece configuration of the supporting end plate and its increased rigidity make it possible to configure both the end plate and the supporting ring of the supporting end plate from a non-metallic material. A plastic is preferably used. The end plate and/or the supporting ring are/is particularly preferably configured from a fiber reinforced plastic. A particularly high rigidity with low eddy current losses can be made possible as a result.

It has proven advantageous if the end plate and the supporting ring are configured from the same material. The manufacturing of the supporting end plate can be simplified as a result.

It is provided in accordance with an alternative, advantageous refinement that the supporting end plate is configured as a hybrid component, the end plate being configured from a first material and the supporting ring being configured from a second material. In the case of a refinement of this type with a single-piece supporting end plate, the regions of the end plate and the supporting ring can be configured in an optimized manner by way of the selection of suitable materials for their respective function, a single-piece component with an increased rigidity and a satisfactory assembly capability being obtained at the same time. The supporting end plate optionally comprises more than two materials, with the result that at least one region of the supporting end plate is formed from a third material.

In this context, it has proven advantageous if the first material which forms the region of the end plate is molded onto the second material which forms the region of the supporting ring. As an alternative, the second material can be molded onto the first material.

The first material is preferably a fiber reinforced plastic, with the result that the rigidity and the loadbearing capability of the region of the supporting ring are improved.

In accordance with one advantageous refinement, the first material has fibers, in particular endless fibers, which are arranged so as to run in a circumferential direction of the supporting ring. A particularly high rigidity and load-bearing capability can be made possible in the region of the supporting ring by way of a refinement of this type. The region of the end plate can be configured from a plastic which is not fiber reinforced. As an alternative, the region of the end plate is configured from a fiber reinforced plastic.

One preferred refinement provides that a spline system of the first material with the second material is configured in a transition region between the end plate and the supporting ring. In the case of a refinement of this type, tooth-like regions of the supporting ring can be enclosed in each case by tooth-like regions of the end plate, as viewed in the circumferential direction of the supporting ring. The cohesion of the first and second material can be improved by way of the spline system.

One advantageous refinement of the invention provides that the end plate has at least one positioning bore for facilitating the positioning of the end plate on the end side of the laminated core. During the assembly of the end plate on the laminated core of the stator; the positioning bore can be aligned with a marking, for example a marking bore, on the end side of the laminated core. A plurality of positioning bores, in particular two positioning bores, are preferably provided on the end plate.

It is provided in accordance with one advantageous refinement that the supporting end plate, in particular the supporting ring, has a positioning shoulder which engages into a cutout in the end side of the laminated core. A positively locking connection between the supporting end plate and the laminated core of the stator can be made possible by way of the interaction of the positioning shoulder with the cutout in the end side of the laminated core.

It is advantageous if the recesses of the end plate correspond with grooves in the laminated core of the stator. In this respect, the recesses in the end plate correspond to the lamination. As a result, it becomes possible to lay the winding of the stator through a groove in the laminated core and then through a recess which corresponds with the groove.

BRIEF DESCRIPTION OF THE DRAWING

In the following text, further features and advantages of the invention are to be described using the exemplary embodiments which are shown in the drawings. Here, the drawings illustrate merely exemplary embodiments of the invention which do not restrict the concept of the invention. In the drawings.

DETAILED DESCRIPTION OF THE INVENTION

Figure 1:
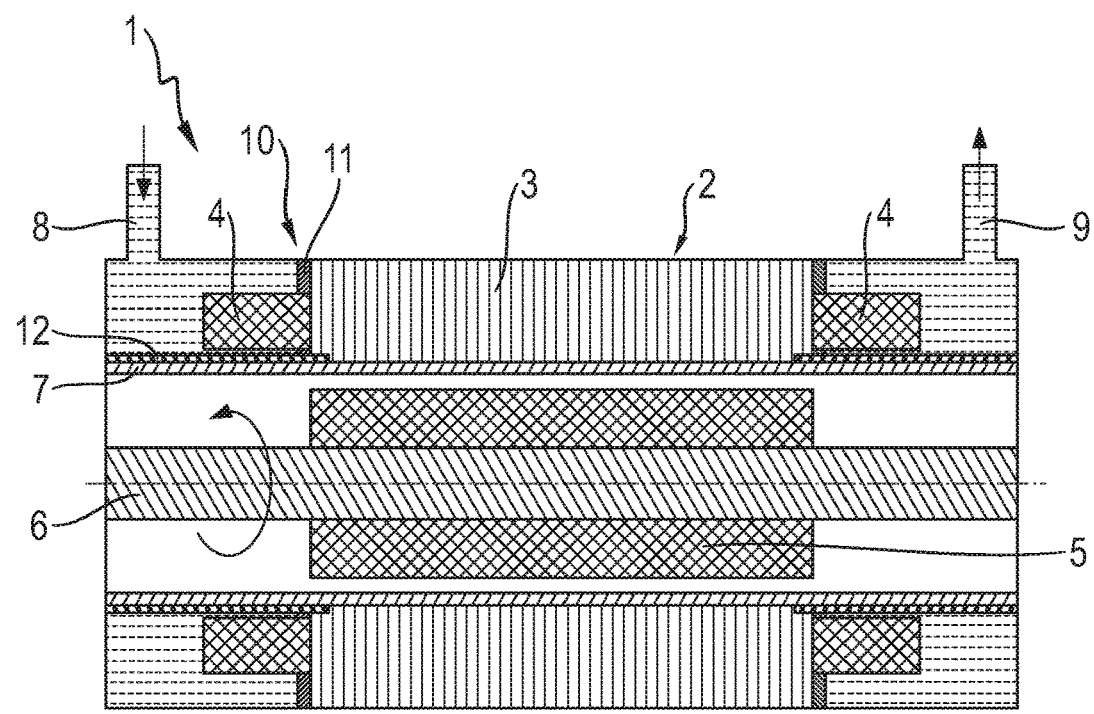
FIG. 1 shows a canned motor in accordance with a first exemplary embodiment of the invention, in a diagrammatic sectional illustration.

FIG. 1 shows a canned motor 1 in accordance with one exemplary embodiment of the invention, which canned motor 1 makes direct cooling of a winding head of a stator winding possible. The canned motor 1 has a stator 2 which comprises a laminated core 3 and a winding, of which the winding heads 4 which project on the end sides of the laminated core 3 are visible in the illustration. A further constituent part of the canned motor 1 is a rotor 5 which is mounted such that it can be rotated with respect to the stator 2. The rotor 5 is arranged concentrically within the substantially cylindrical ring-shaped stator 2 and is connected fixedly to a shaft 6 so as to rotate with it. There is a cylindrical ring-shaped air gap between the stator 2 and the rotor 5, in which air gap a can 7 is arranged. The region of the stator 2 is sealed via the can 7 in a liquid-tight manner with respect to the inner rotor 5, with the result that the stator 2, in particular the winding heads 4, can be cooled via liquid. To this end, the canned motor has an inlet 8 and an outlet 9 for a cooling liquid. During operation, a liquid, electrically non-conductive cooling medium is introduced into the region via the inlet 8, flows around the winding heads 4 of the stator 2 and the winding in a direction parallel to the rotational axis of the canned motor 1, and is then discharged via the outlet 9. The can 7 is configured as a liner which is laminated onto the inner contour of the laminated core 3 and onto the inner contour of the supporting end plate 10.

In order to reinforce the can 7 in the region of the winding heads 4, in each case one supporting end plate 10 is provided on the end sides of the laminated core 3 in the case of the canned motor, which supporting end plate 10 comprises a supporting ring 12 which is arranged concentrically with respect to the can 7, bears against the outer contour of the can 7 and encloses the latter. Furthermore, the supporting end plate 10 comprises an end plate 11 which bears against an end side of the laminated core 3 and has recesses for leading through the winding. The end plate 11 prevents it being possible for a groove bottom insulation to be damaged on the sharp-edged sheet contour on the end side of the laminated core 3.

According to the invention, the end plate and the supporting ring are configured as a single-piece supporting end plate, with the result that the single-piece supporting end plate takes over both the function of the end plate and the function of the supporting ring.

Figure 2:
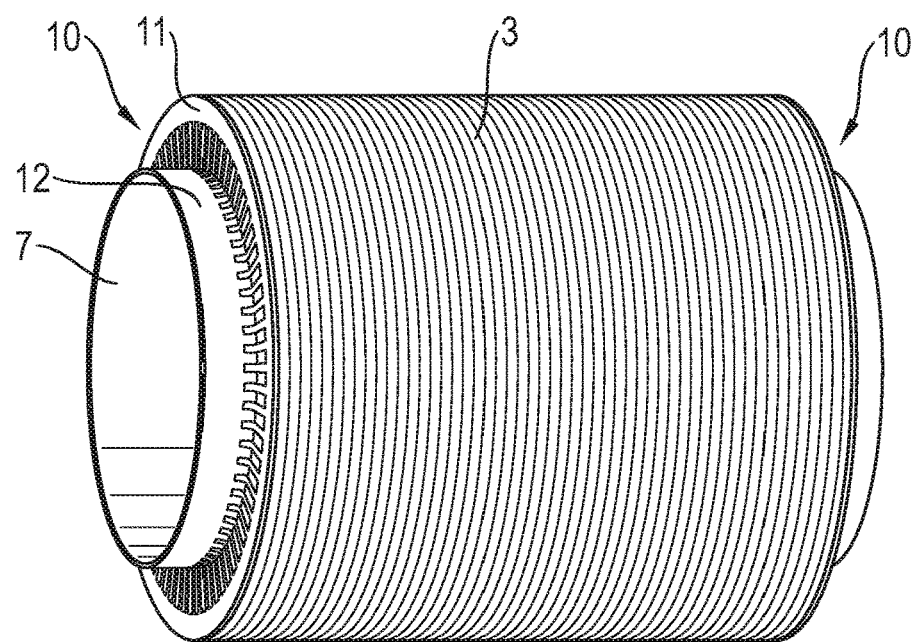
FIG. 2 shows a laminated core of a stator with two supporting end plates which are arranged on the end sides of the stator, in a perspective illustration.
Figure 3:
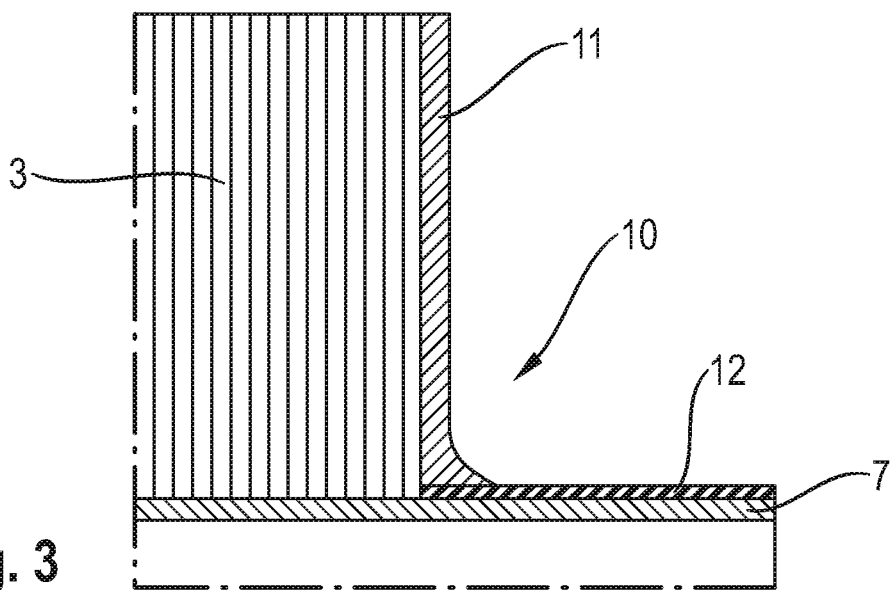
FIG. 3 shows the region of the supporting end plate according to FIG. 2, in a diagrammatic sectional illustration.

FIG. 2 and FIG. 3 show an assembly of a laminated core 3 with two supporting end plates 10 which are arranged on the end sides of the laminated core 3. The supporting end plates 10 can be screwed or adhesively bonded to the end side of the laminated core 3.

The entire supporting end plate 10, that is to say both the end plate 11 and the supporting ring 12, is configured from a non-metallic material, preferably a plastic, particularly preferably from a fiber reinforced plastic, with the result that undesired eddy current losses are reduced during the operation of the canned motor 1.

Figure 4:
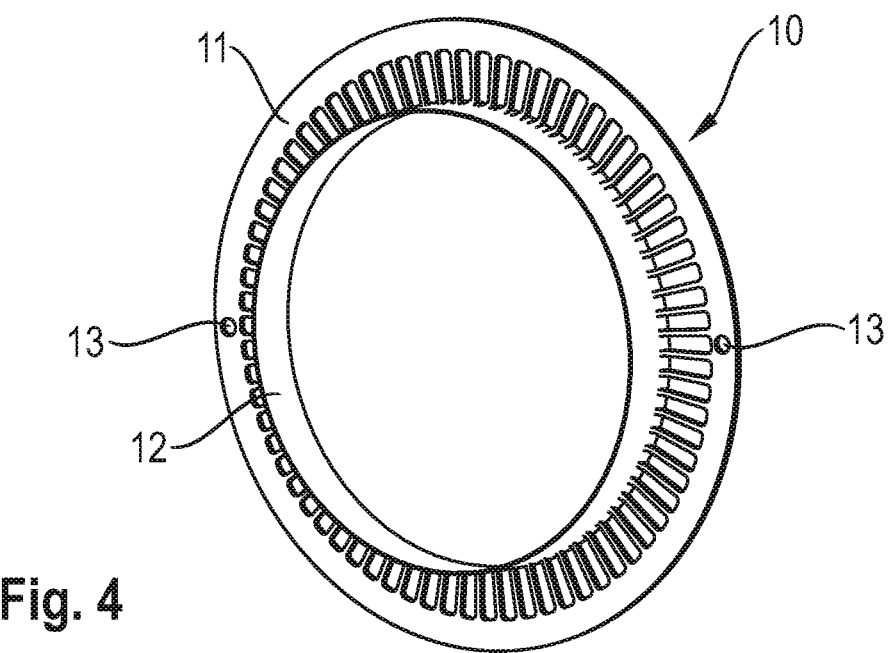
FIG. 4 shows a supporting end plate in accordance with a first exemplary embodiment of the invention, in a perspective illustration.
Figure 5:
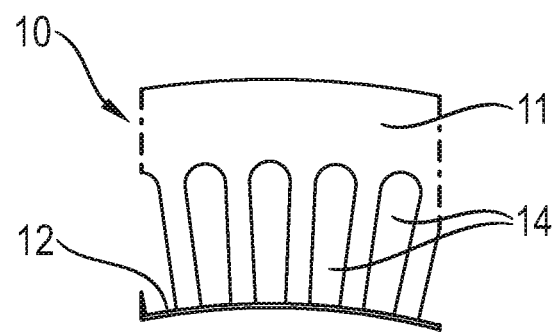
FIG. 5 shows a detailed illustration of the supporting end plate from FIG. 4 in the region of the end plate, in a plan view from the axial direction.

FIG. 4 and FIG. 5 show a first exemplary embodiment of a supporting end plate 10 which can be used in a canned motor according to FIG. 1. Said supporting end plate 10 has an end plate 11 and a supporting ring 12 which are both configured from the same material. A plastic, particularly preferably a fiber reinforced plastic, is selected as material. Furthermore, the supporting end plate 10 has a plurality of (here, two) positioning bores 13 which facilitate the positioning of the end plate 11 on the end side of the laminated core 3. During the assembly of the supporting end plate 10 on the end side of the laminated core 3, a connecting element (for example, a screw) can optionally be guided through the positioning bore, in order to attach the supporting end plate to the laminated core 3. The recesses 14 in the end plate 11 of the supporting end plate 10 are arranged in such a way that they correspond with the grooves in the laminated core 3.

Figure 6:
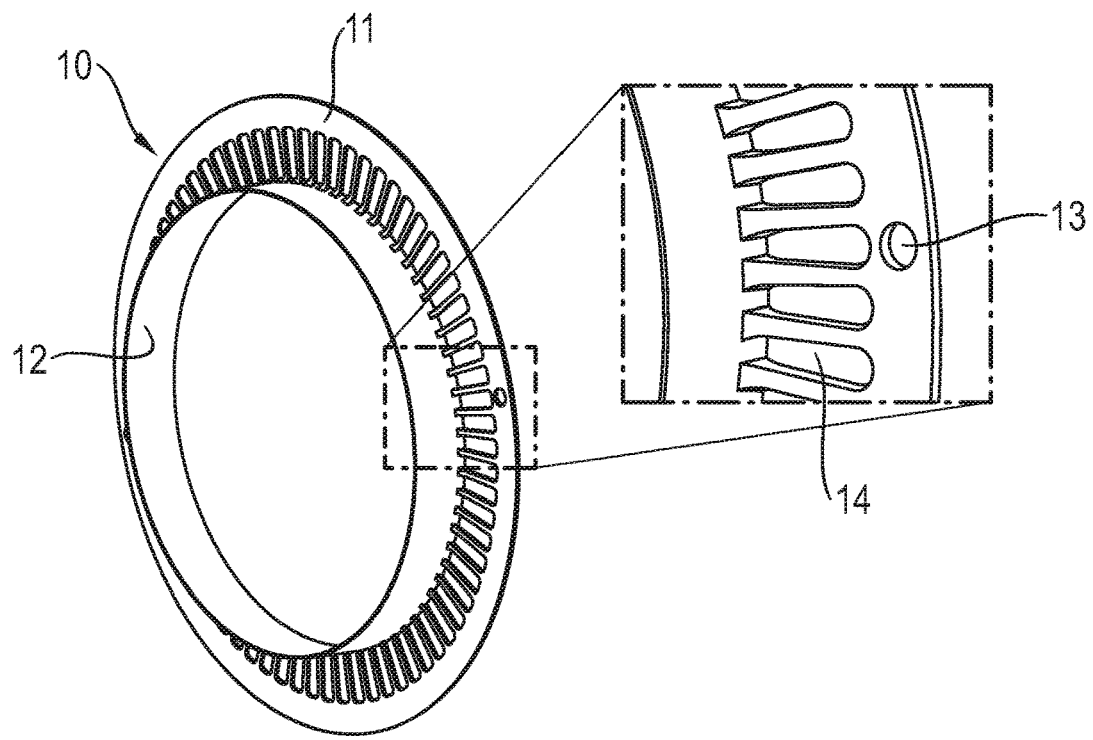
FIG. 6 shows a supporting end plate in accordance with a second exemplary embodiment of the invention.

FIG. 6 shows a second exemplary embodiment of a supporting end plate 10 which can be used in a canned motor according to FIG. 1. Said supporting end plate 10 has an identical shape to the supporting end plate from FIG. 3. Said supporting end plate 10 is configured as a hybrid component, however, in the case of which the end plate 11 is configured from a first material and the supporting ring 12 is configured from a second material. The first material (in the region of the end plate 11) is a fiber reinforced plastic, with the result that the rigidity and load-bearing capability of the region of the supporting ring are improved. The first material comprises fibers, in particular endless fibers, which are arranged so as to run in a circumferential direction of the supporting ring 12. A configuration of this type makes a particularly high rigidity and load-bearing capability in the region of the supporting ring 12 possible. In order to manufacture the hybrid component, the first material which forms the region of the end plate 11 can be molded onto the second material which forms the region of the supporting ring 12.

Figure 7:
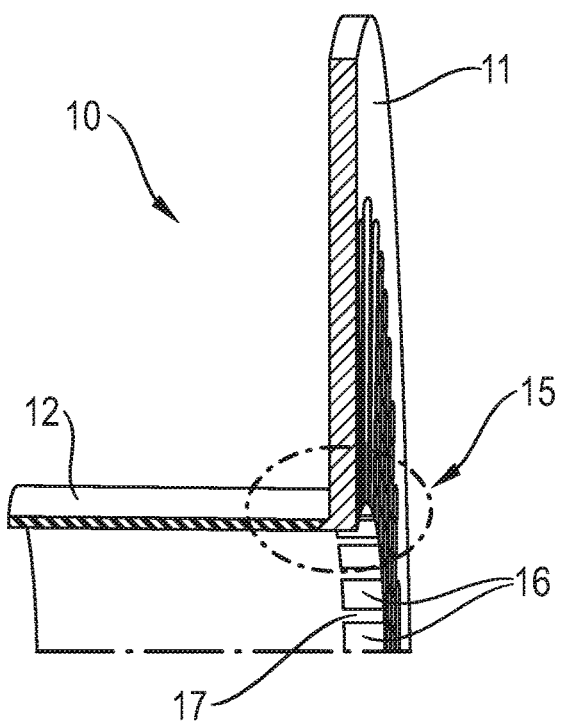
FIG. 7 shows a supporting end plate in accordance with a third exemplary embodiment of the invention, in a sectioned, perspective illustration.

FIG. 7 shows a modification of the exemplary embodiment from FIG. 6. Said supporting end plate 10 is also configured as a hybrid component. In contrast to the exemplary embodiment which is shown in FIG. 6, the supporting end plate 10 has a spline system of the first material with the second material in a transition region 15 between the end plate 11 and the supporting ring 12. Here, as viewed in the circumferential direction of the supporting ring 12, first tooth-like regions 17 of the supporting ring 12 are enclosed in each case by second tooth-like regions 16 of the end plate 11. The cohesion of the first and second material in the transition region is improved by way of the spline system.

Figure 8:
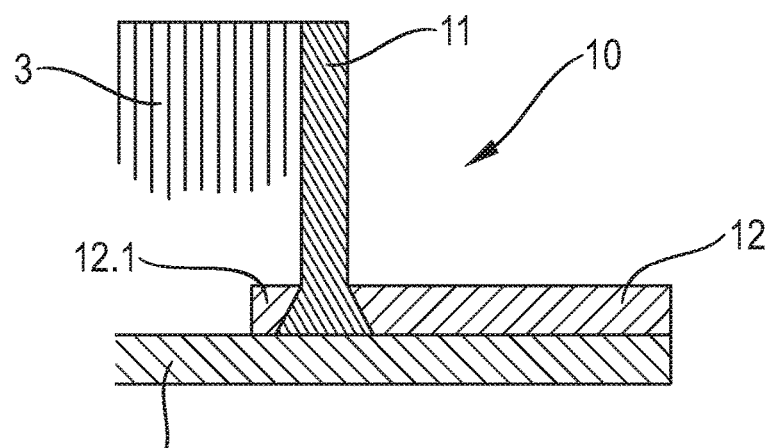
FIG. 8 shows a laminated core of a stator with a supporting end plate in accordance with a fourth exemplary embodiment of the invention which is arranged on an end side of the stator, in a diagrammatic sectional illustration.

FIG. 8 shows a further assembly of a laminated core 3 with a supporting end plate 10 in accordance with a fourth exemplary embodiment of the invention which is arranged on an end side of the laminated core 3. Even if FIG. 8 shows only one end side of the laminated core 3, an identical supporting end plate can be arranged on a second end side of the laminated core 3. The supporting end plate 10 can be screwed or adhesively bonded to the end side of the laminated core 3. The supporting end plate 10 in accordance with the fourth exemplary embodiment has a positioning shoulder 12.1 which engages into a cutout in the end side of the laminated core 3. In this respect, a positively locking connection between the supporting end plate 10 and the laminated core 3 of the stator 2 is made possible. The positioning shoulder 12.1 is configured as part of the supporting ring 12 which projects beyond an outer face of the end plate 11, which outer face bears against the end side of the laminated core 3. The positioning shoulder 12.1 therefore forms a continuation of the supporting ring 12 which is arranged on a first side of the end plate 11 on a second side of the supporting ring 12, which second side lies opposite the first side.

Figures 9, 10:
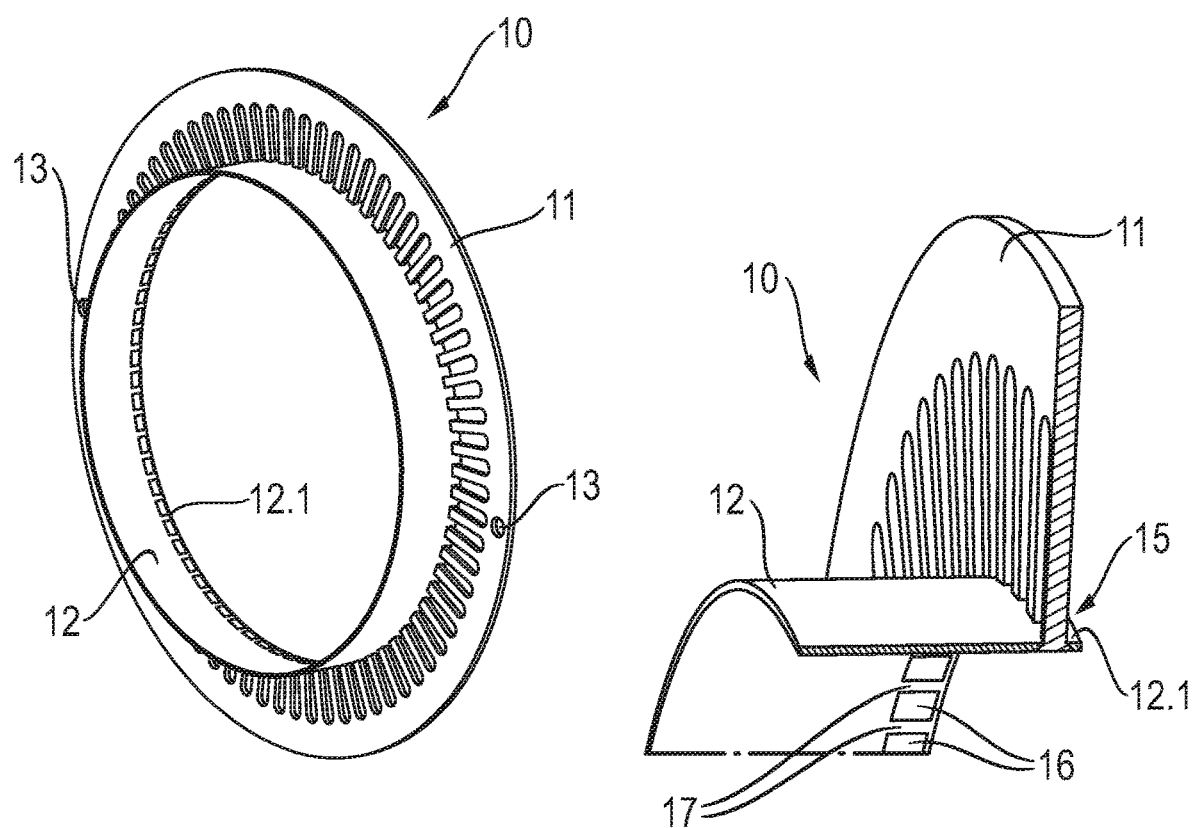
FIG. 9 shows the supporting end plate in accordance with the fourth exemplary embodiment from FIG. 8, in a perspective illustration.
FIG. 10 shows the supporting end plate in accordance with the fourth exemplary embodiment om FIG. 8, in a sectioned, perspective illustration.

The supporting end plate 10 in accordance with the fourth exemplary embodiment which is shown separately in FIG. 9 and FIG. 10 is configured as a hybrid component made from non-metallic materials. The plate 11 is formed from a first material which is configured as a fiber reinforced plastic. The supporting ring 12 is configured from a second material, preferably a polyimide, in particular polycaprolactam (PA 6). The second material can be molded onto the first material. In a similar manner to the supporting end plate which is shown in FIG. 7, the supporting end plate 10 in accordance with the fourth exemplary embodiment has a spline system of a first material with the second material in a transition region 15 between the end plate 11 and the supporting ring 12. This means that, as viewed in a circumferential direction of the supporting ring 12, first tooth-like regions 11 of the supporting ring 12 are enclosed in each case by second tooth-like regions 16 of the end plate 11. Furthermore, the supporting end plate 10 has a plurality of (here, two) positioning bores 13 which facilitate the positioning of the end plate 11 on the end side of the laminated core 3.

In the case of the above-described exemplary embodiments of a canned motor 1, a stator 2 is provided in each case which has a laminated core 3 and a winding with winding heads 4 which project out of the laminated core 3 on end sides of the laminated core 3.

Furthermore, said canned motors 1 have a rotor 5 which is mounted rotatably with respect to the stator 2, and a can 7 which is arranged between the stator 2 and the rotor 5. An end plate 11 with recesses 14 for leading through the winding bears against an end side of the laminated core 3, and a supporting ring 12 is arranged concentrically with respect to the can 7 on the outer side of the can 7 in the region of the winding heads 4. The end plate 11 and the supporting ring 12 are configured as a single-piece supporting end plate 19, with the result that the assembly complexity during the manufacturing of the canned motor 1 is reduced.

What is claimed is:
1. A canned motor comprising:
   a stator which has a laminated core and a winding with winding heads which project out of the laminated core on end sides of the laminated core,
   a rotor which is rotatably mounted with respect to the stator,
   a can which is arranged between the stator and the rotor,
   an end plate which bears against one end side of the laminated core and has recesses for leading through the winding, and
   a supporting ring which is arranged concentrically with respect to the can on an outer side of the can in a region of the winding heads,
   wherein the end plate and the supporting ring are configured as a single-piece supporting end plate,
   wherein the end plate is configured from a first material and the supporting ring is configured from a second material that is different from the first material.

2. The canned motor as claimed in claim 1, wherein the supporting ring comprises a wall that extends axially from a first end to a second end,
and wherein the end plate comprises a wall that extends radially outwardly from the first end of the supporting ring.

3. The canned motor as claimed in claim 2, wherein the first end of the supporting ring is positioned closer to the laminated core than the second end.

4. The canned motor as claimed in claim 1, wherein one of the end plate and the supporting ring are configured from a non-metallic material or a plastic.

5. The canned motor as claimed in claim 1, wherein the first material is molded onto the second material.

6. The canned motor as claimed in claim 1, wherein the first material is a fiber reinforced plastic.

7. The canned motor as claimed in claim 6, wherein the first material comprises fibers, which are arranged so as to run in a circumferential direction of the supporting ring.

8. The canned motor as claimed in claim 1, wherein a spline system of the first material with the second material is configured in a transition region between the end plate and the supporting ring.

9. The canned motor as claimed in claim 1, wherein the end plate has at least one positioning bore for facilitating the positioning of the end plate on said one end side of the laminated core.

10. The canned motor as claimed in claim 1, wherein the supporting ring has a positioning shoulder which engages into a cutout in said one end side of the laminated core.

11. The canned motor as claimed in claim 1, wherein the recesses of the end plate correspond with grooves in the laminated core.

12. The canned motor as claimed in claim 1, wherein at least a portion of the first end of the supporting ring extends beneath one of the winding heads.

13. The canned motor as claimed in claim 1, wherein the end plate has an annular shape and the supporting ring has a cylindrical shape.

14. The canned motor as claimed in claim 1, wherein the rotor extends axially.

15. The canned motor as claimed in claim 1, wherein a thickness of the end plate is greater than a thickness of the supporting ring.

\* \* \* \* \*